United States Patent [19]

Lehr et al.

[11] 4,312,642
[45] Jan. 26, 1982

[54] METHOD FOR THE SEPARATE DISCHARGE OF THE INDIVIDUAL PHASE STREAMS OF A MULTIPLE PHASE FLOW

[75] Inventors: Günter Lehr, Krefeld; Karl-Dieter Löhr; Uwe Hucks, both of Alpen; Hugo Vernaleken, Walsrode, all of Fed. Rep. of Germany

[73] Assignee: Bayer Aktiengesellschaft, Leverkusen, Fed. Rep. of Germany

[21] Appl. No.: 126,267

[22] Filed: Mar. 3, 1980

[30] Foreign Application Priority Data

Mar. 3, 1979 [DE] Fed. Rep. of Germany ....... 2908352

[51] Int. Cl.³ ............................................. B01D 19/00
[52] U.S. Cl. ........................................ 55/50; 55/52; 55/55; 55/191
[58] Field of Search ................... 55/46, 49, 50, 52, 55, 55/190, 191, 195, 206, 189; 422/137

[56] References Cited

U.S. PATENT DOCUMENTS

| 1,614,526 | 1/1927 | Lambie et al. | 55/191 |
| 2,048,286 | 7/1936 | Pease | 422/137 |
| 3,078,512 | 2/1963 | De Haven | 55/191 |
| 3,442,065 | 5/1969 | Foras | 55/191 |
| 3,498,762 | 3/1970 | Van Derschee et al. | 55/52 |
| 3,595,627 | 7/1971 | Abbott et al. | 55/191 |
| 3,630,689 | 12/1971 | Wheeler et al. | 422/137 |
| 3,686,826 | 8/1972 | Saunder et al. | 55/52 |
| 4,148,990 | 4/1979 | Kuxdorf et al. | 55/206 |

FOREIGN PATENT DOCUMENTS 46-28762  8/1971  Japan ..................................... 55/52

Primary Examiner—David L. Lacey
Attorney, Agent, or Firm—Sprung, Felfe, Horn, Lynch & Kramer

[57] ABSTRACT

A method for the separate discharge of the individual phase streams of a multiple component flow comprising a high viscosity slow flowing liquid or suspension and a gas flowing at at least 100 times faster with the volumetric ratio of the gas to the liquid being greater than 1:1. The multicomponent flow is transversely fed through an inlet and directly into a rotating helical channel for conveying liquid in one direction. The channel has a liquid outlet spaced from the inlet in the one direction and a gas outlet spaced from the inlet in the opposite direction. A gas shut-off is formed between the inlet and the liquid outlet so as to effect the discharge of gas through the gas outlet in the opposite direction during the conveying of the liquid by the helical channel to the liquid outlet in the one direction.

4 Claims, No Drawings

METHOD FOR THE SEPARATE DISCHARGE OF THE INDIVIDUAL PHASE STREAMS OF A MULTIPLE PHASE FLOW

BACKGROUND OF THE INVENTION

The invention relates to a method for the separate discharge of the individual phase streams of a multiple phase flow consisting, in particular, of a high viscosity, slow-flowing liquid or suspension and a gas flowing at least 100 time faster, the volumetric ratio of the gas to the liquid being greater than 1:1.

Polymers have to be isolated from solutions and/or suspensions in many chemical engineering processes. A known method of concentrating them makes use of a multiple phase flow in a spiral pipe in which a viscous liquid stream is propelled by a flowing gas which can consist of evaporated solvent, with the optional addition of foreign gas, along the wall of the spiral pipe. In this process, the desired evaporation can be achieved by adjusting the evaporation temperature and the partial pressure of the components to be evaporated out in the gas volume, which is controlled by the pressure at the end of the spiral pipe as well as by the optional addition of foreign gas. To separate the individual phase flows, the multiple phase stream is fed into a centrifugal separator.

The disadvantage of the known method lies in the fact that the vapor/gas mixture issuing from the end pipe of the evaporator at high speed is accompanied by liquid residues which are hurled against the housing wall of the centrifugal separator, remain there for a prolonged period and lead to the formation of specks in the case of a certain polymers. The term "specks" refers to highly colored particles of cracked products which are produced from the polymers due to prolonged residence on the wall and simultaneous high temperatures. Discoloration and particles (specks) consequently occur in the product and substantially reduce the quality of the polymers to be isolated.

German Auslegeschrift No. 1 921 045 describes a vertically standing cyclone with a belt screw and a conveyor screw in which the pipe with the multiple phase flow is introduced tangentially with respect to the cyclone. This apparatus has the disadvantage that the simple coil does not clean itself and the formation of specks cannot therefore be reduced, so the quality of the product is again impaired. In addition, the seal of the shaft as it passes through the bottom gives rise to considerable problems in structure and operation.

SUMMARY OF THE INVENTION

The object of the invention is to find a method which allows the individual phase streams arriving at differing speeds and in differing quantities of a multiple phase flow to be discharged along separate paths in such a way that the quality of the product to be obtained is regular, uniform and high as a result of well defined separation.

The object is achieved according to the invention in that the multiple phase flow is fed directly to a transversely running flow wherein the liquid component is forcibly delivered in one direction by a helical channel rotating about its screw axis and forms a gas shut-off such that the gas component is discharged in the opposite direction.

It is surprising to the skilled man that neither turbulence nor foaming occur during the sharp deflection and simultaneous separation of the phase streams which flow in a closed-in manner but are interspersed, despite the high gas speed ($\leq$ speed of sound) and differing quantities. Instead, the liquid or suspension component is carried off continuously without problems by the rotating helical channel, while the gas component flows out in the opposite direction via screw threads which optionally increase in volume depending on the pressure drops. This method therefore allows rapid, clean separation of the two phases with immediate discharge of the media. It is therefore particularly suitable for viscous, thermally sensitive products.

In a particular embodiment of the method, the multiple phase flow is introduced into a double shaft screw apparatus having two meshing screws rotating in the same direction, whose profiles touch each other and the wall of the housing directly or approximately in each cross-section.

Particles of product are prevented from settling on the double shaft screw by the reciprocal scraping of all parts of the double shaft screw contacted by the product. Thus, in the case of a temperature-sensitive products, specks which would greatly reduce the quality of the product if they happened to dissolve later on, are prevented from forming due to prolonged over-heating.

In a specific embodiment of the method, any very fine residual particles of the product entrained by the gas stream are ejected, by reversing the pitch of the helical channel in the gas region from that of the main liquid stream.

This measure prevents the finest residual particles from entering the main liquid stream and thus reducing the quality of the product.

In another embodiment of the method, the vapor is condensed in a subsequent cooler and the condensate runs down the walls for rinsing purposes.

The rinsing allows particles of product which have settled on the walls to be removed again and prevents them from blocking the cooler.

A few embodiments of the invention are described in more detail below.

DETAILED DESCRIPTION OF THE INVENTION

A multiple phase flow pipe which is surrounded by a heating jacket merges into a screw running transversely thereto and having a drive shaft.

The screw is, in turn, surrounded by a housing at a small distance from it which ends in a nozzle at the downstream end of the screw, while a vapor dome with a pipe is arranged at the opposite end.

The multiple phase flow pipe ends in an opening opposite a screw having a section of reverse pitch which runs toward the vapor dome just downstream of the opening and whose thread depth is larger so as to provide improved gas discharge. An outlet nozzle for undesirable residual particles of the product is also provided at this end of the screw.

A meshing double shaft screw is arranged downstream of the multiple phase flow pipe and their profiles almost touch each other and the wall of the housing in each cross-section due to the small gap widths. Opposite the nozzle, the two meshing screws merge into a cooler which has an outlet at its bottom and a gas delivery tube at its top. The large heat exchange surfaces are supplied with an appropriate coolant via an inlet and an outlet.

Suitable screw machines include all known types which can be designed optimally for the respective product with respect to pitch, mesh to core diameter, speed, number of screws and screw length.

The multiple phase flow composed of a viscous, slowly flowing liquid and a gas flowing at high speed flows toward a screw rotating transversely to it.

The liquid is immediately taken up by the screw and conveyed to the nozzle, forming a gas-tight seal in the screw channel between the opening and nozzle.

The gas flows out in the opposite direction, depending on the pressure drop, and leaves the housing via the vapor dome so that it can be discharged through pipe or after condensation via the heat exchanger through the pipe, the coolant being conveyed via the inlet and the outlet in the latter case. With an opposing screw, residual particles of product to be separated from the gas stream are removed via the outlet nozzle.

We claim:

1. In a method for the separate discharge of the individual phase streams of a multiple component flow comprising a high viscosity slow flowing liquid or suspension and a gas flowing at least 100 times faster with the volumetric ratio of the gas to the liquid or suspension being greater than 1:1, the improvement comprising: transversely feeding the multi-component flow through an inlet and directly into a rotating helical channel for conveying liquid in one direction and having a liquid outlet spaced from the inlet in the one direction and a gas outlet spaced from the inlet in the opposite direction to form a gas shut-off between the inlet and the liquid outlet to effect the discharge of the gas through the gas outlet in said opposite direction during the conveying of the liquid by the helical channel to the liquid outlet in said one direction.

2. The method according to claim 1, wherein the multiple phase flow is transversely fed into a double shaft screw apparatus having meshing screws rotating in a housing in the same direction and having profiles which at least approximately touch each other and the wall of the housing in each cross-section.

3. The method according to claim 1 or 2, further comprising condensing the gas from the gas outlet in a cooler and rinsing the condensate by running same down the walls of the cooler.

4. The method according to claim 1, wherein the pitch of the helical channel is reversed upstream of the inlet to eject fine particles entrained by the gas stream.

* * * * *